(12) United States Patent
Ball et al.

(10) Patent No.: US 8,871,093 B2
(45) Date of Patent: Oct. 28, 2014

(54) FILTER MEDIA RETAINER ASSEMBLY

(75) Inventors: Christopher J. Ball, Cranberry Township, PA (US); Brian Bates, Cranberry Township, PA (US)

(73) Assignee: Xylem Water Solutions Zelienople LLC, Zelienople, PA (US)

( * ) Notice: Subject to any disclaimer, the term of this patent is extended or adjusted under 35 U.S.C. 154(b) by 354 days.

(21) Appl. No.: 13/349,185

(22) Filed: Jan. 12, 2012

(65) Prior Publication Data

US 2013/0180906 A1    Jul. 18, 2013

(51) Int. Cl.
- *B01D 24/22*    (2006.01)
- *B01D 24/46*    (2006.01)
- *B01D 24/24*    (2006.01)

(52) U.S. Cl.
CPC ............ *B01D 24/22* (2013.01); *B01D 24/4631* (2013.01); *B01D 24/24* (2013.01)
USPC ............................ 210/274; 210/275; 210/293

(58) Field of Classification Search
CPC ..... B01D 24/22; B01D 24/24; B01D 24/4631
USPC ........................... 210/291, 293, 498, 274, 275
See application file for complete search history.

(56) References Cited

U.S. PATENT DOCUMENTS

| | | |
|---|---|---|
| 3,613,888 A | 10/1971 | Harris |
| 3,632,978 A | 1/1972 | Boze et al. |
| 3,762,559 A | 10/1973 | Knoy et al. |
| 3,831,761 A | 8/1974 | Chantereau |
| 3,840,117 A | 10/1974 | Ross |
| RE28,458 E | 7/1975 | Ross |
| 3,956,134 A | 5/1976 | Sturgill |
| 4,065,391 A | 12/1977 | Farabaugh |
| 4,082,664 A | 4/1978 | Lindstol |
| 4,191,652 A | 3/1980 | Whitmore |
| 4,196,079 A | 4/1980 | Ward |
| 4,331,542 A | 5/1982 | Emrie |
| 4,478,726 A | 10/1984 | Moore |
| 4,564,450 A | 1/1986 | Piper et al. |
| 4,743,382 A | 5/1988 | Williamson et al. |
| 4,750,999 A | 6/1988 | Roberts et al. |
| 4,933,524 A | 6/1990 | Meurer |
| 5,019,259 A | 5/1991 | Hambley |
| 5,108,627 A | 4/1992 | Berkebile et al. |
| 5,116,443 A | 5/1992 | Meurer |
| 5,149,427 A | 9/1992 | Brown et al. |
| 5,232,592 A | 8/1993 | Brown et al. |
| 5,269,920 A | 12/1993 | Brown et al. |
| 5,332,497 A | 7/1994 | Shea et al. |

(Continued)

*Primary Examiner* — Matthew O Savage
(74) *Attorney, Agent, or Firm* — The Webb Law Firm, P.C.

(57) ABSTRACT

A filter system for filtering a liquid containing particles including a single media retainer plate having a top and bottom surface, and defining at least one hopper-shaped compartment having a sloped wall defining a slot spanning the top and bottom surfaces is disclosed. The plate also includes at least one baffle extending from the bottom surface and filter media disposed on the top surface. During a filtering operation of the filter system, the filter media captures the particles, such as dirt, from the liquid as the liquid passes through the filter media to an underdrain system. During a backwash operation of the filter system, the baffle is adapted to direct a backwash fluid in a vertical direction through the slot so that the backwash fluid actuates the filter media to scour the top surface of the plate and prevent the build-up of biological scaling on the plate.

13 Claims, 13 Drawing Sheets

(56) References Cited

U.S. PATENT DOCUMENTS

| | | |
|---|---|---|
| 5,489,388 A | 2/1996 | Brown et al. |
| 5,639,384 A | 6/1997 | Brown et al. |
| 5,865,999 A | 2/1999 | Shea et al. |
| 5,916,104 A | 6/1999 | Lucenet et al. |
| 5,976,370 A | 11/1999 | Medworth |
| 6,071,419 A | 6/2000 | Beier et al. |
| 6,090,284 A | 7/2000 | Melber et al. |
| 6,190,568 B1 | 2/2001 | Hunkele |
| 6,387,283 B1 | 5/2002 | Lind |
| 6,569,328 B1 | 5/2003 | Haggard |
| 6,797,166 B1 | 9/2004 | Hambley et al. |
| 6,830,684 B2 | 12/2004 | Stegge |
| 6,991,726 B2 | 1/2006 | St. Germain |
| 7,063,787 B2 | 6/2006 | Jackson et al. |
| 7,090,771 B2 | 8/2006 | Dyson et al. |
| 7,138,056 B2 | 11/2006 | Hambley et al. |
| 7,192,521 B2 | 3/2007 | St. Germain |
| 7,288,193 B2 | 10/2007 | Roberts et al. |
| 7,326,351 B2 | 2/2008 | Hambley et al. |
| 7,410,578 B2 | 8/2008 | Hambley et al. |
| 7,481,930 B2 | 1/2009 | Roberts |
| 7,494,592 B2 | 2/2009 | Deskins |
| 7,736,506 B2 | 6/2010 | Roberts et al. |
| 7,754,089 B2 | 7/2010 | Roberts |
| 7,820,043 B2 | 10/2010 | Roberts et al. |
| 7,897,040 B2 | 3/2011 | Newcombe et al. |
| 7,922,903 B2 | 4/2011 | Roberts et al. |
| 2005/0133434 A1 | 6/2005 | Hambley et al. |
| 2005/0194302 A1 | 9/2005 | Roberts et al. |
| 2007/0175832 A1 | 8/2007 | Roberts |
| 2008/0073256 A1 | 3/2008 | Tezuka et al. |
| 2008/0099411 A1 | 5/2008 | Roberts et al. |
| 2008/0110817 A1 | 5/2008 | Sugiura et al. |
| 2009/0001011 A1 | 1/2009 | Knipmeyer et al. |
| 2009/0071909 A1 | 3/2009 | Newcombe et al. |
| 2009/0071914 A1 | 3/2009 | Roberts et al. |
| 2010/0078394 A1 | 4/2010 | Bennett |
| 2011/0073549 A1 | 3/2011 | Geibel et al. |
| 2014/0021121 A1* | 1/2014 | Ball et al. ............... 210/275 |

* cited by examiner

FILTER MEDIA RETAINER ASSEMBLY

BACKGROUND

1. Field of the Disclosure

The present disclosure relates generally to a filter system for filtering a liquid containing particles. More particularly, the present disclosure relates to a filter system including a filter media assembly that retains filter media and prevents the build-up of biological and/or chemical scaling on the filter media assembly.

2. Description of the Related Art

Typical gravity or pressure filters use some type of filter media that captures undesirable particles, such as dirt, from a liquid being filtered as the liquid passes through the filter media to an underdrain or collection system. The filter media must be supported so that it will not pass into the underdrain or collection system.

One type of common media support utilizes one or more layers of gravel placed below the filter media to prevent the filter media from passing. Common gravel-less systems include a flat media retainer plate having either a slot sized small enough to retain the required filter media or plastic beads held together chemically or sintered together. Such systems are prone to clogging by biological or chemical scaling, which adheres to the flat media retainer plate, thus blocking or clogging the water pathways. The pressure drop across the filter assembly may continue to increase and cause a failure in the system when the head loss across the system exceeds the design pressure drop.

FIGS. 7A and 7B are representative of a common flat media retainer plate as described above. Referring to FIGS. 7A and 7B, flat media retainer plate 200 includes top surface 202, bottom surface 204, and defines slots or water pathways 206 therethrough. Referring to FIG. 7B, flat media retainer plate 200 is shown with biological film 208 adhered to top surface 202 of plate 200 and clogging water pathways 206.

SUMMARY

The present disclosure provides a filter system for filtering a liquid containing particles, such as a liquid for fresh water, drinking water, or wastewater applications, which includes a media retainer assembly including a single filter media retainer plate, i.e., the media retainer assembly includes only one filter media retainer plate connected to an underdrain assembly and the filter media retainer plate has a longitudinal axis located in a plane and the media retainer assembly does not include any additional plates located above or below the filter media retainer plate. The single filter media retainer plate includes a top surface, a bottom surface, and defines at least one hopper-shaped compartment having at least one sloped wall defining at least one slot spanning the top and bottom surfaces. The filter media retainer plate also includes at least one baffle extending from the bottom surface and filter media disposed on the top surface. During a filtering operation of the filter system, the filter media captures the particles, such as dirt, from the liquid as the liquid passes through the filter media to an underdrain or collection system. During a backwash operation of the filter system, the baffle is adapted to direct a backwash fluid in a vertical direction through the slot so that the backwash fluid actuates the filter media to scour the top surface of the filter media retainer plate and prevent the build-up of biological and/or chemical scaling on the filter media retainer plate. In one embodiment, the single filter media retainer plate includes one plate section. In other embodiments, the single filter media retainer plate includes more than one plate section.

By having a filter system that only includes a single filter media retainer plate, the cost of the filter system of the present disclosure is significantly reduced as compared to filter assemblies that include more than one plate. Additionally, the time and complexity of assembling the filter system of the present disclosure is significantly reduced as compared to such filter assemblies that include more than one plate.

By having a filter system that utilizes filter media to remove dirt, debris, chemical and biological contaminants from liquid containing particles flowing through the filter system and also utilizes the filter media to scour the top surface of the filter media retainer plate to remove any biological films that may accumulate on the filter media retainer plate, the filter system of the present disclosure does not require any separate scouring particles in addition to the filter media. Accordingly, the cost and complexity of the filter system of the present disclosure is significantly reduced as compared to filter assemblies that include separate scouring particles in addition to the filter media.

In accordance with an embodiment of the present disclosure, a media retainer assembly for retaining filter media in a filter system includes a filter media retainer plate having a top surface, a bottom surface, and defining at least one hopper-shaped compartment having a first sloped wall defining a first slot and a base portion defining a second slot, the first slot and the second slot each spanning the top surface and the bottom surface of the filter media retainer plate. The media retainer assembly of this embodiment includes a first baffle extending from the bottom surface of the filter media retainer plate. The media retainer assembly further includes a second baffle extending from the bottom surface of the filter media retainer plate, the first baffle and the second baffle together adapted to direct a flow of a fluid in a vertical direction through the first slot and the second slot and prevent the flow of the fluid in a horizontal direction beneath the bottom surface of the filter media retainer plate beyond the first baffle and the second baffle.

In accordance with another embodiment of the present disclosure, a media retainer assembly for retaining filter media in a filter system includes a filter media retainer plate having a top surface, a bottom surface, and defining at least one hopper-shaped compartment having a first sloped wall defining a first slot and a base portion defusing a second slot, the first slot and the second slot each spanning the top surface and the bottom surface of the filter media retainer plate. The media retainer assembly of this embodiment includes guide means for directing a flow of a fluid in a vertical direction through the first slot and the second slot and preventing the flow of the fluid in a horizontal direction beneath the bottom surface of the filter media retainer plate beyond the guide means.

In accordance with another embodiment of the present disclosure, a filter system for filtering a liquid containing particles includes an underdrain assembly having an underdrain wall defining an underdrain chamber adapted to contain a backwash fluid. The filter system of this embodiment includes a media retainer assembly including a filter media retainer plate having a top surface defining a filter media chamber, a bottom surface, and defining at least one hopper-shaped compartment having a first sloped wall defining a first slot and a base portion defining a second slot, the first slot and the second slot each spanning the top surface and the bottom surface of the filter media retainer plate, the filter media chamber in fluid communication with the underdrain chamber. The media retainer assembly further includes a filter medium disposed on the top surface of the filter media retainer plate, the filter medium adapted to capture the particles from the liquid with the liquid passing from the filter media chamber to the underdrain chamber, and the filter medium adapted to scour the top surface of the filter media retainer plate with the backwash fluid passing from the underdrain chamber to the filter media chamber. The media retainer assembly further includes a first baffle extending from the bottom surface of the filter media retainer plate and a second baffle extending from the bottom surface of the filter media retainer plate, the first baffle and the second baffle together adapted to direct the backwash fluid in a vertical direction through the first slot and the second slot and prevent the backwash fluid in a horizontal direction beneath the bottom surface of the filter media retainer plate beyond the first baffle and the second baffle.

BRIEF DESCRIPTION OF THE DRAWINGS

The above-mentioned and other features and advantages of this disclosure, and the manner of attaining them, will become more apparent and the disclosure itself will be better understood by reference to the following descriptions of embodiments of the disclosure taken in conjunction with the accompanying drawings, wherein.

Corresponding reference characters indicate corresponding parts throughout the several views. The exemplifications set out herein illustrate exemplary embodiments of the disclosure, and such exemplifications are not to be construed as limiting the scope of the disclosure in any manner

DETAILED DESCRIPTION

For purposes of the description hereinafter, spatial orientation terms, if used, shall relate to the referenced embodiment as it is oriented in the accompanying drawings or otherwise described in the following detailed description. However, it is to be understood that the embodiments described hereinafter may assume many alternative variations and embodiments. It is also to be understood that the specific embodiments illustrated in the accompanying drawings and described herein are simply exemplary and should not be considered as limiting.

Figure 1:
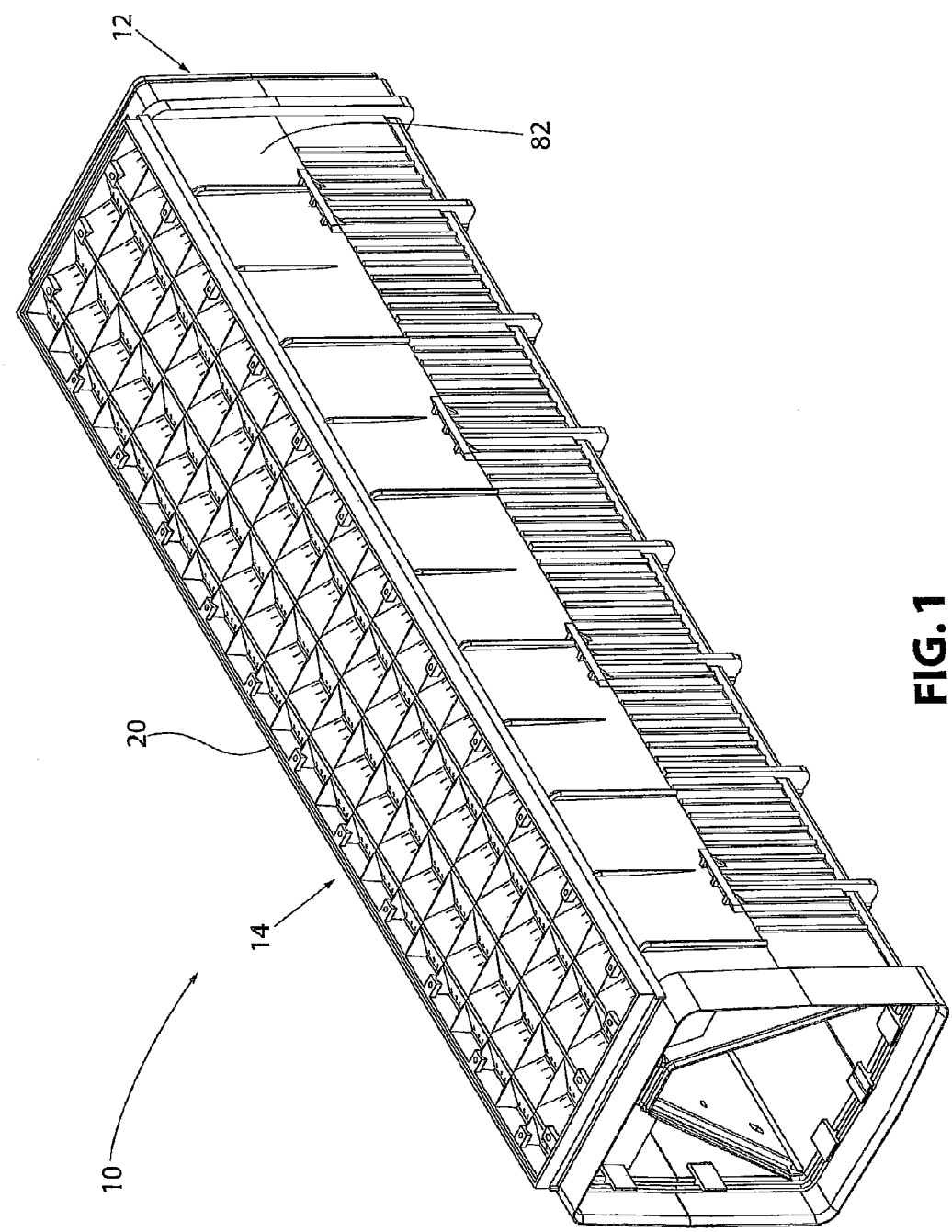
FIG. 1 is a perspective view of a filter system in accordance with an exemplary embodiment of the present disclosure.
Figure 2:
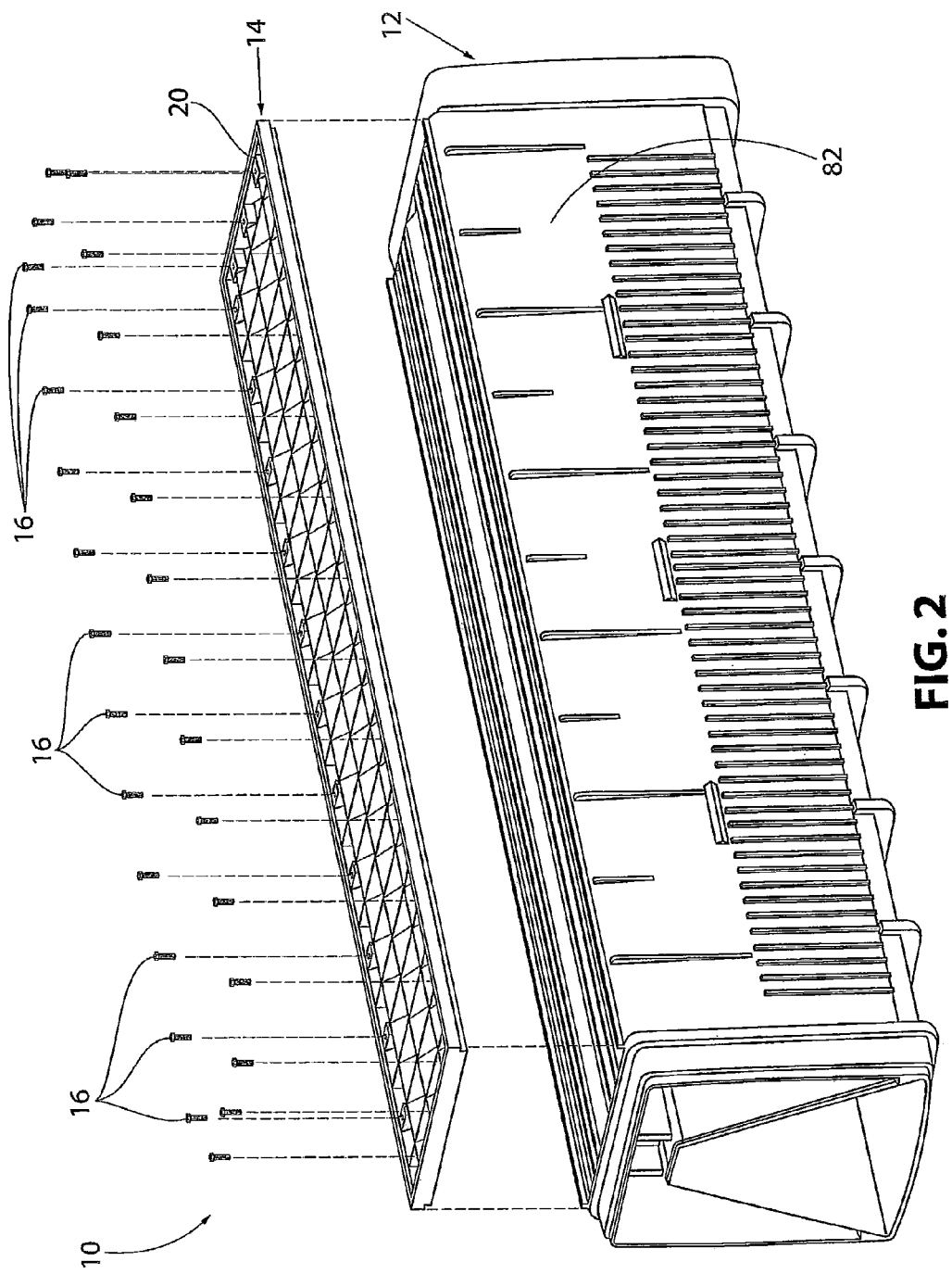
FIG. 2 is an exploded, perspective view of the filter system of FIG. 1.
Figure 4A:
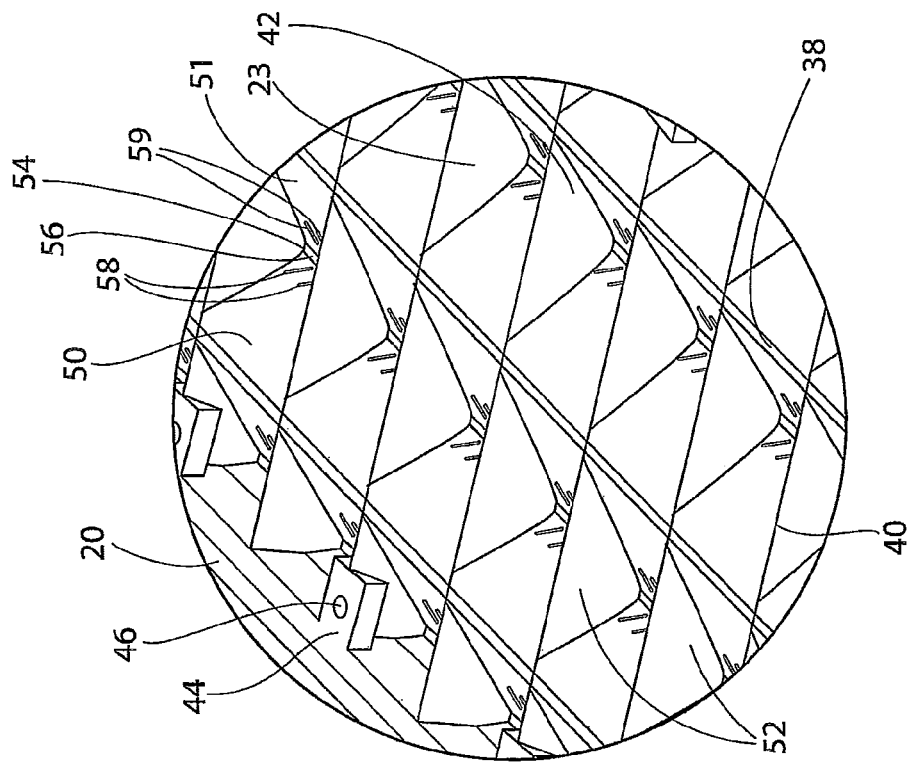
FIG. 4A is a detailed, enlarged fragmentary view of a plurality of compartments of the filter media retainer plate of FIG. 3 in accordance with an exemplary embodiment of the present disclosure.
Figure 4B:
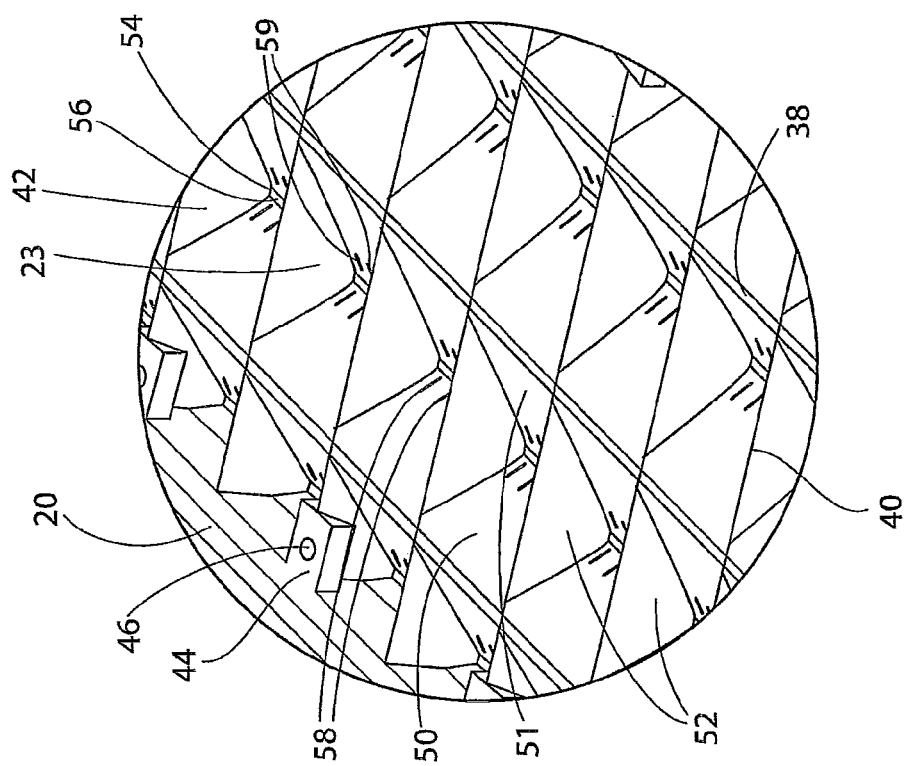
FIG. 4B is a detailed, enlarged fragmentary view of a plurality of compartments of the filter media retainer plate of FIG. 3 in accordance with another exemplary embodiment of the present disclosure.
Figure 4D:
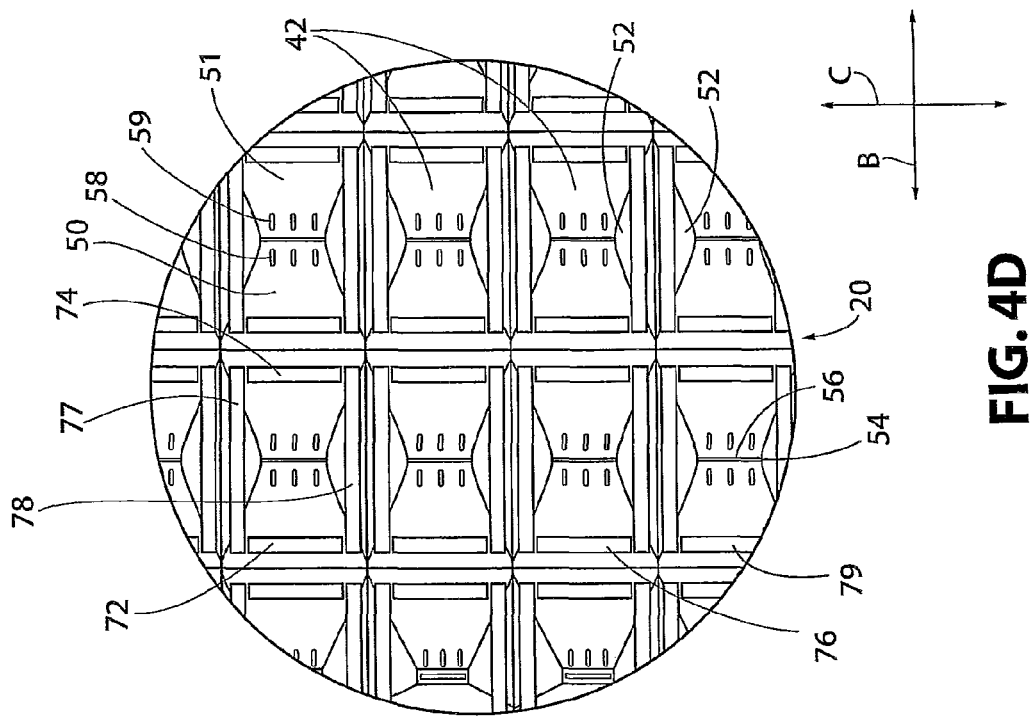
FIG. 4D is a detailed, enlarged fragmentary bottom view of a plurality of compartments of the filter media retainer plate of FIG. 4A in accordance with an exemplary embodiment of the present disclosure.
Figure 5:
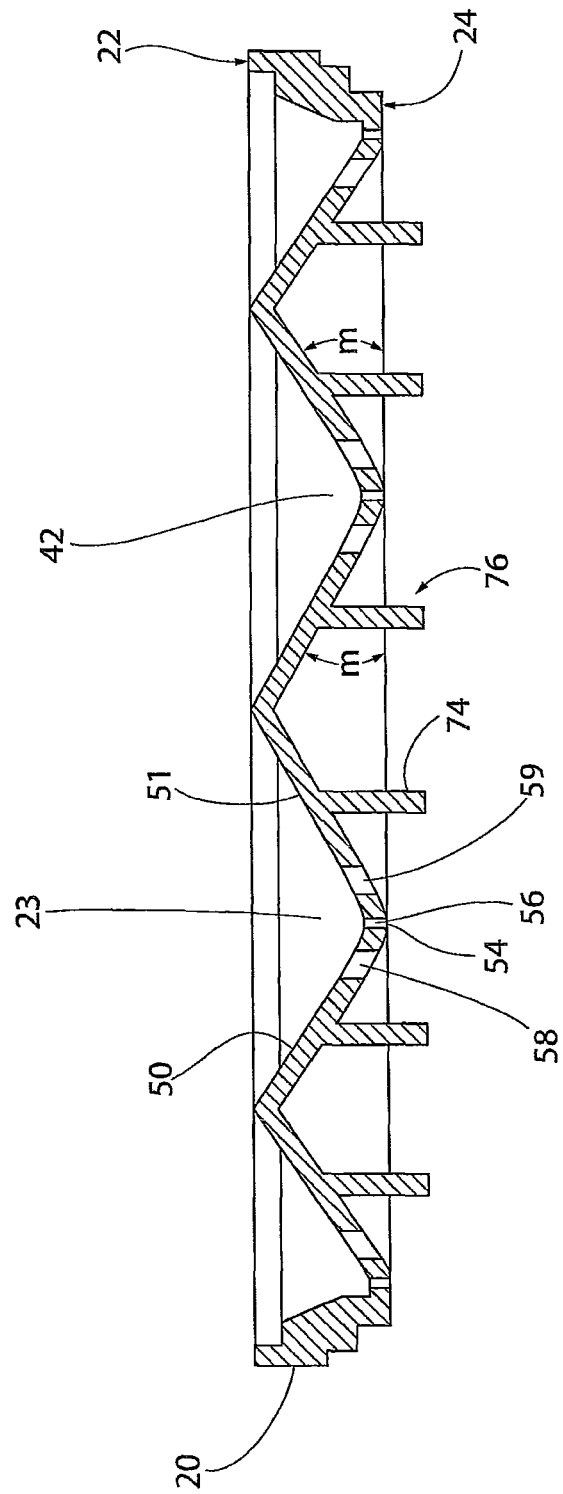
FIG. 5 is a transverse cross-sectional view of the filter media retainer plate of FIG. 3.
Figure 6A:
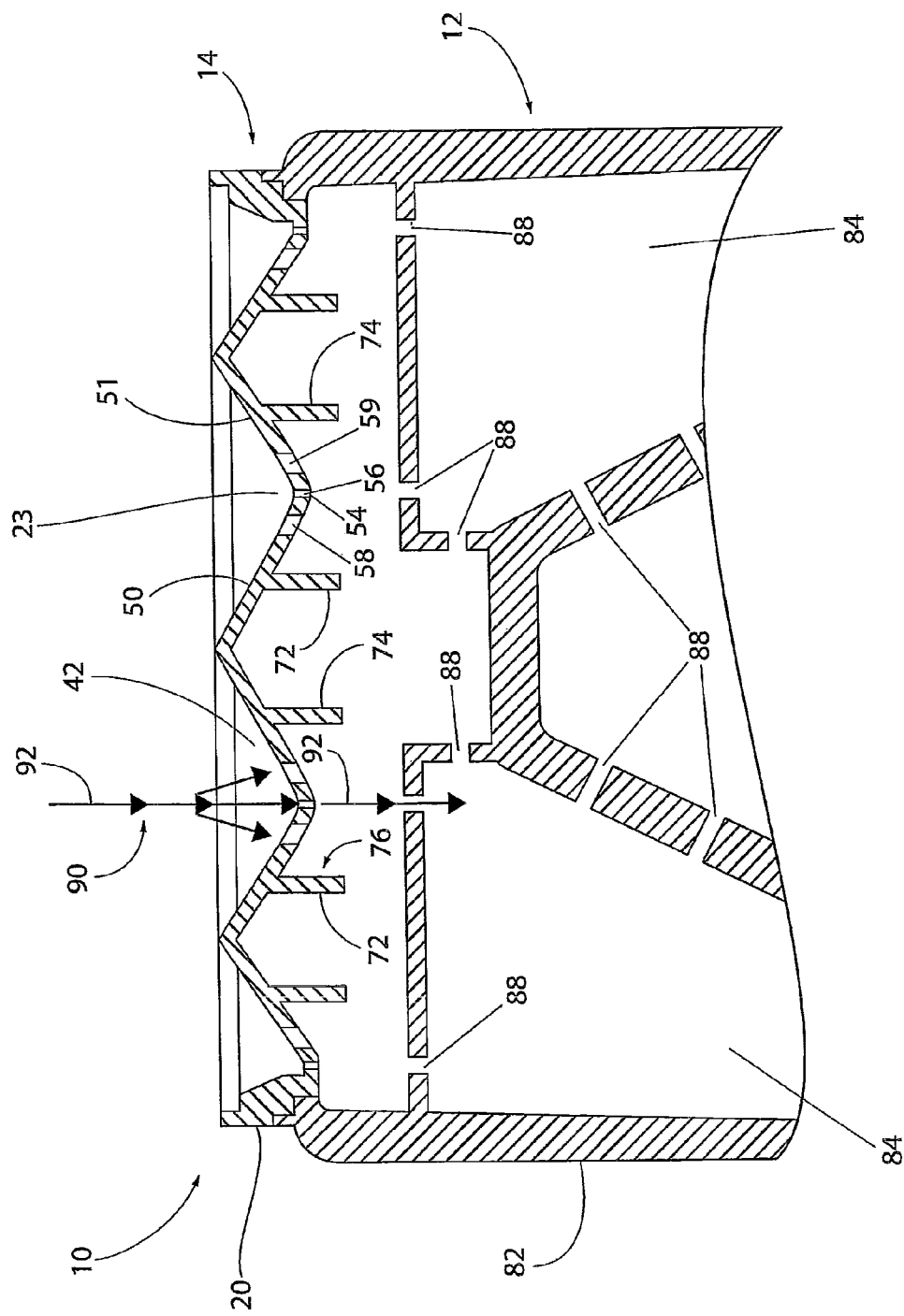
FIG. 6A is a partial, transverse cross-sectional view of the filter system of FIG. 1.
Figure 6B:
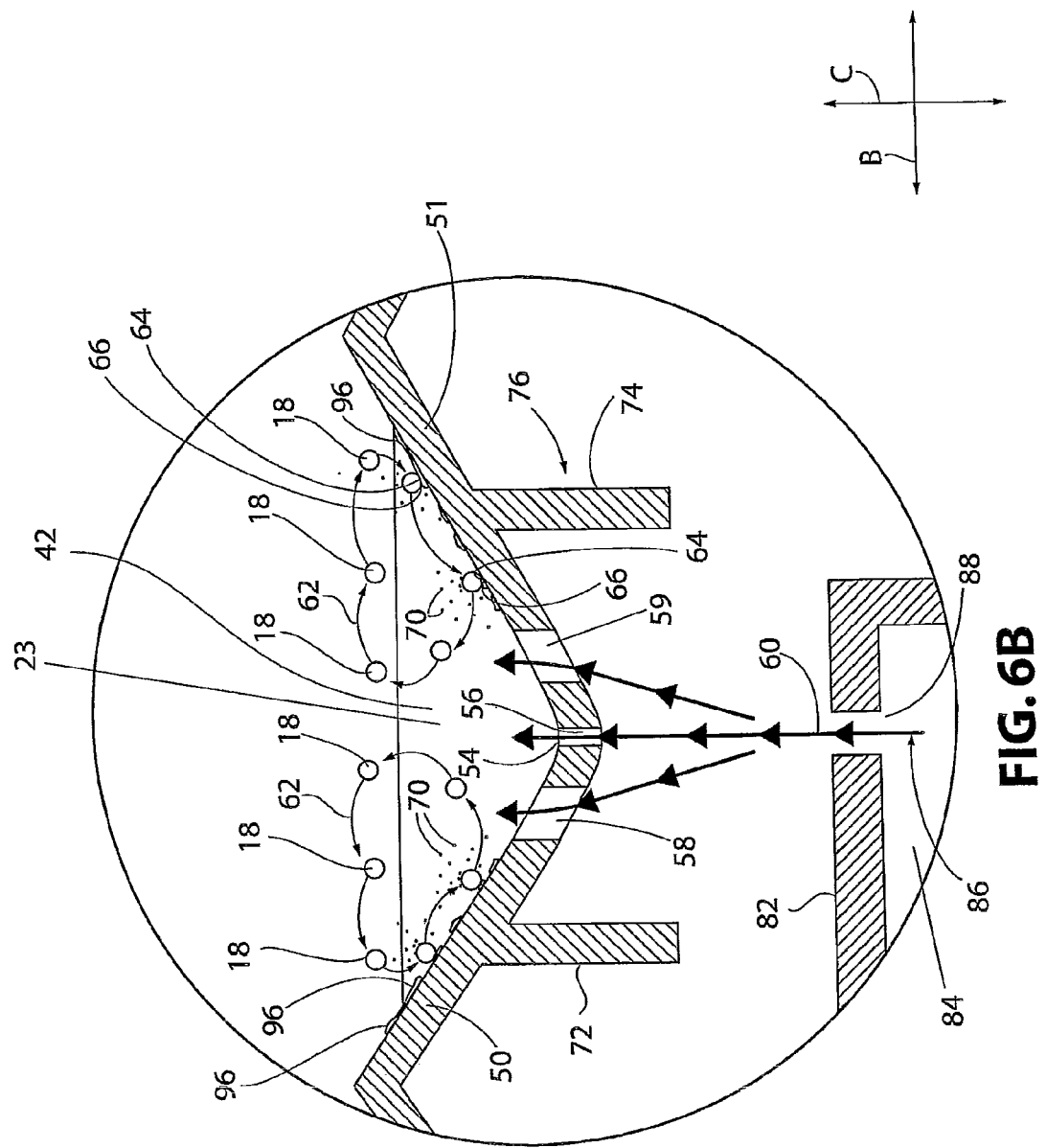
FIG. 6B is a detailed, enlarged fragmentary cross-sectional view of the filter system of FIG. 6A, with filter media scouring a top surface of a media retainer plate in accordance with an exemplary embodiment of the present disclosure.
Figure 7A:
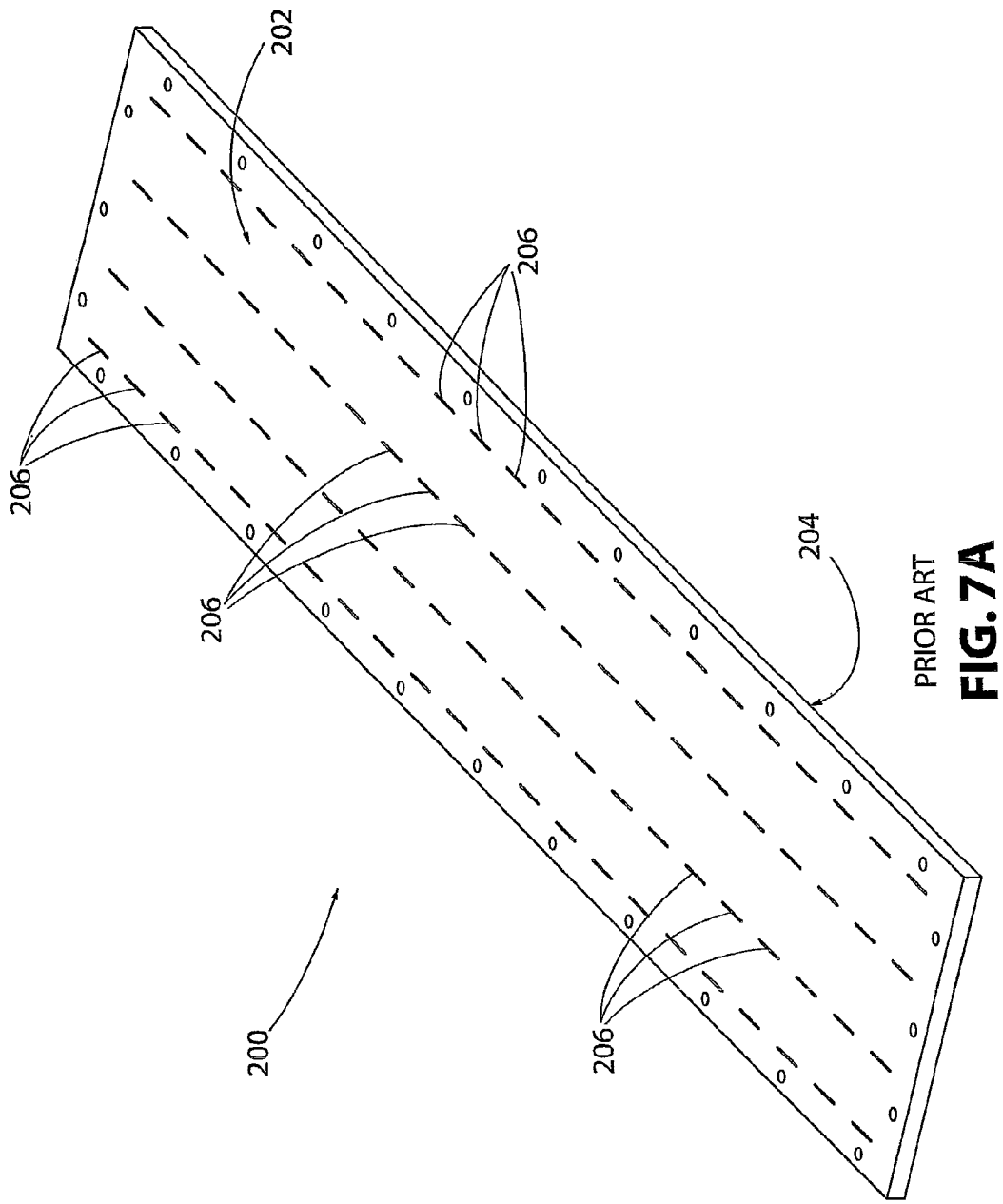
FIG. 7A is a perspective view of a prior art flat media retainer plate.
Figure 7B:
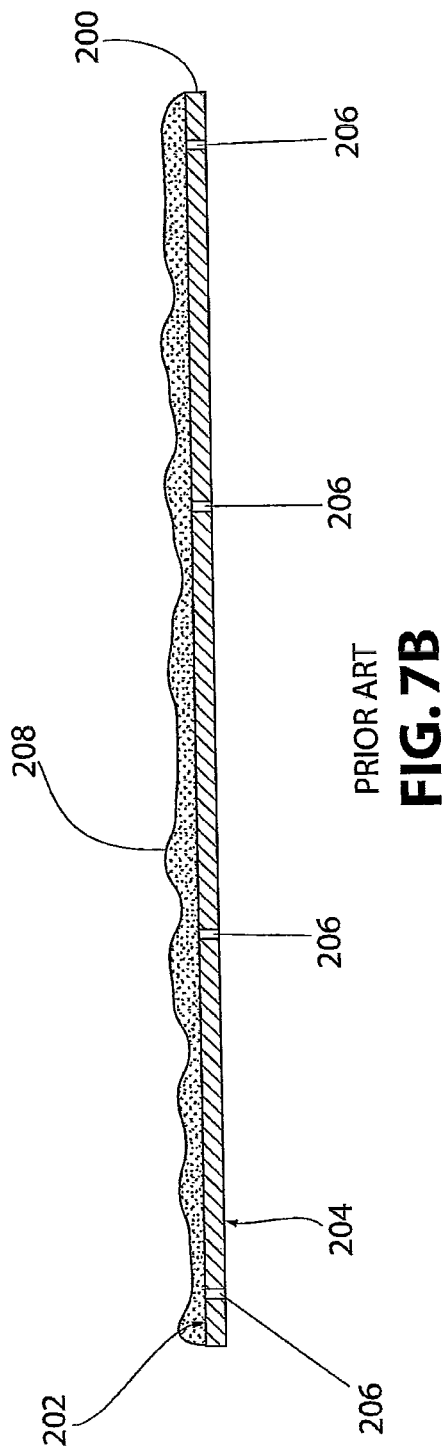
FIG. 7B is a transverse cross-sectional view of the prior art flat media retainer plate of FIG. 7A.

Referring to FIGS. 1, 2 and 6A, gravity or pressure filter assembly or filter system 10 includes underdrain assembly or underdrain block 12, filter media retainer or media retainer assembly 14 which is adapted to be connected to underdrain assembly 12, plurality of fasteners 16 (FIG. 2), and a layer or multiple layers of filter media 18 (FIG. 6B). In one embodiment, filter system 10 includes underdrain assembly 12 extending in a longitudinal direction and media retainer assembly 14 mounted to the top of underdrain assembly 12 by a plurality of fasteners 16 as shown in FIGS. 1 and 2. Underdrain block 12 could be part of an underdrain assembly in accordance with the underdrain assembly described in U.S. Pat. No. 5,639,384, issued Jun. 17, 1997, and commonly assigned with the present application, the entire disclosure of which is hereby expressly incorporated herein by reference. Filter media 18 acts to remove and/or capture undesirable particles, such as dirt, debris, chemical and/or biological contaminants, from a liquid flowing through filter system 10. It is contemplated that filter media 18 may be of any type known to be suitable by those having ordinary skill in the art, such as multiple layers of sand and gravel. During a backwash operation of filter system 10, in one embodiment, a guide means of filter system 10 is adapted to direct a backwash fluid, such as backwash fluid 86 (FIG. 6B), in a vertical direction generally along arrow A (FIG. 6B) through slots 56, 58, 59 (FIGS. 4A-6B) so that the backwash fluid actuates filter media 18 to scour top surface 22 of filter media retainer plate 20 and prevent the build-up of biological and/or chemical scaling on filter media retainer plate 20. The guide means also prevents the flow of the fluid in a horizontal direction generally along arrow B (FIG. 6B) beneath bottom surface 24 of filter media retainer plate 20 beyond the guide means.

Referring to FIGS. 1-5, media retainer assembly 14 includes a single filter media retainer plate 20, i.e., media retainer assembly 14 includes only one filter media retainer plate 20 connected to the underdrain assembly and filter media retainer plate 20 has a longitudinal axis located in a plane and media retainer assembly 14 does not include any additional plates located above or below filter media retainer plate 20. Filter media retainer plate 20 includes top surface 22 defining filter media chamber 23 and opposing bottom surface 24. Referring to FIG. 3A, filter media retainer plate 20 extends between first end 26 which is defined by first end wall 28 and second end 30 which is defined by second end wall 32. Along the perimeter of filter media retainer plate 20, first sidewall or longitudinal wall 34 and opposing second sidewall or longitudinal wall 36 extend between first end wall 28 and second end wall 32. Opposing longitudinal walls 34, 36 define a longitudinal direction of filter media retainer plate 20, i.e., longitudinal walls 34, 36 run parallel to a longitudinal axis of filter media retainer plate 20. Filter media retainer plate 20 includes a plurality of longitudinal ribs 38 extending between first end wall 28 and second end wall 32 parallel to longitudinal sidewalls 34, 36. Filter media retainer plate 20 also includes a plurality of transverse ribs 40 extending between first longitudinal sidewall 34 and second longitudinal sidewall 36 parallel to end walls 28, 32.

Filter media retaining plate 20 includes mounting portions 44, each defining a mounting aperture 46 therethrough, disposed along a periphery of filter media retainer plate 20. In one embodiment, to connect filter media retainer plate 20 to underdrain assembly 12, a mounting aperture 46 of each mounting portion 44 may be aligned with respective mounting holes (not shown) on a top surface of underdrain block 12. Next, fasteners 16 may be positioned through each mounting aperture 46 and secured to the mounting holes located in the top surface of underdrain block 12 to connect filter media retainer plate 20 to underdrain assembly 12 as shown in FIGS. 1 and 2.

Figure 3A:
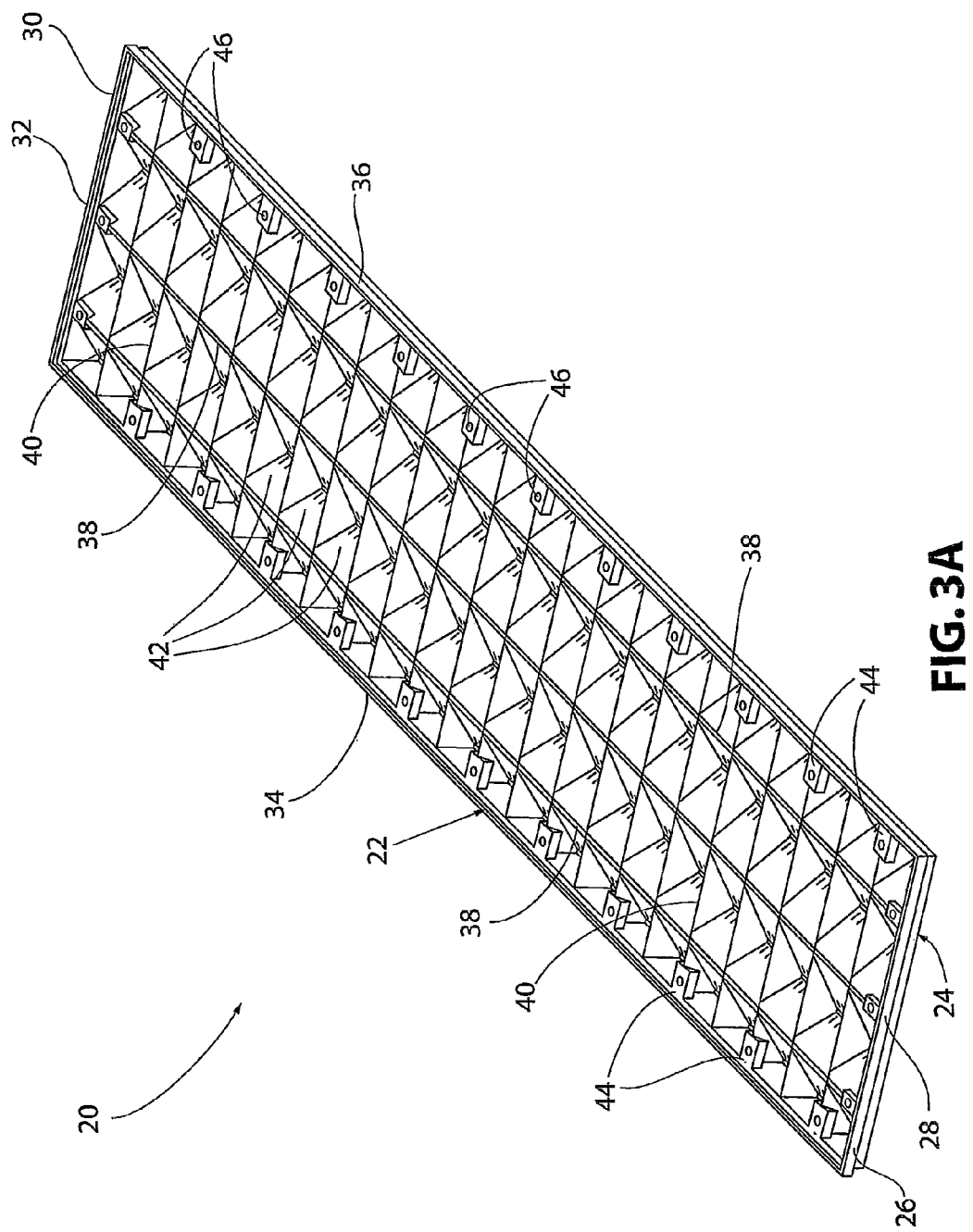
FIG. 3A is a perspective view of a filter media retainer plate in accordance with an exemplary embodiment of the present disclosure.
Figure 3B:
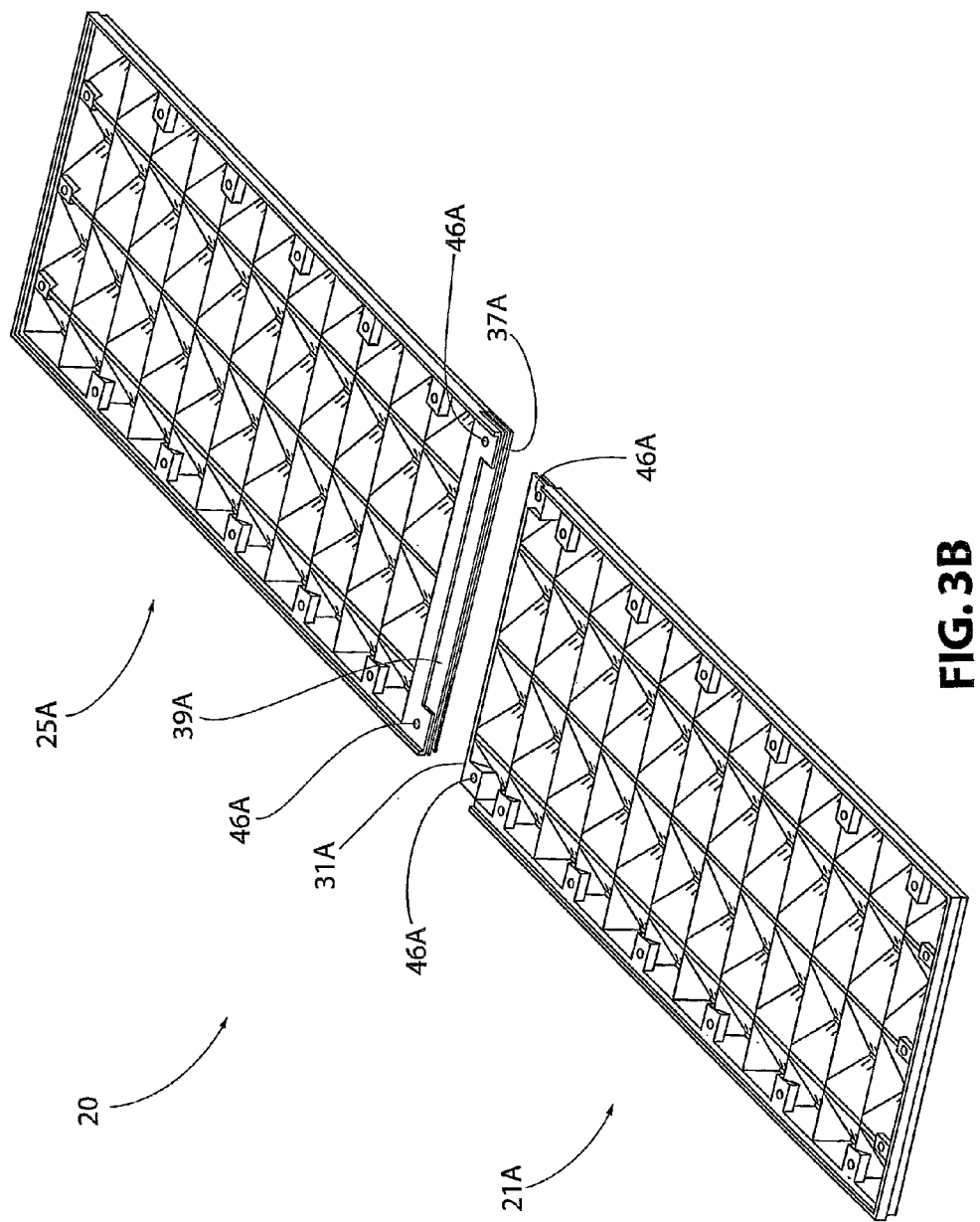
FIG. 3B is an exploded, perspective view of a filter media retainer plate in accordance with an exemplary embodiment of the present disclosure having more than one plate section.
Figure 3C:
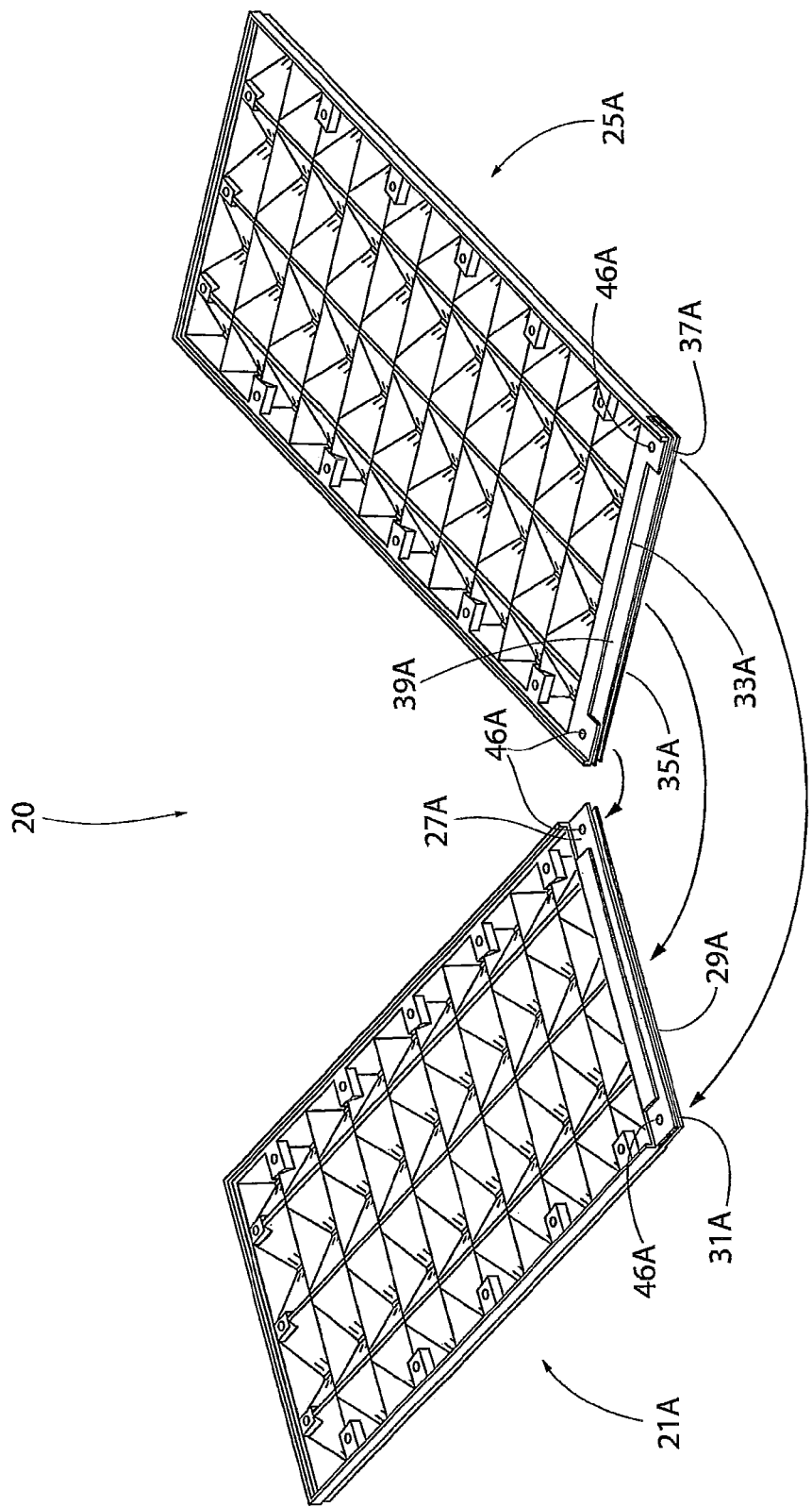
FIG. 3C is an exploded, perspective view of the filter media retainer plate of FIG. 3B.

Referring to FIG. 3A, in one embodiment, media retainer assembly 14 includes one plate section, i.e., filter media retaining plate 20. Referring to FIGS. 3B and 3C, in an alternative embodiment, filter media retaining plate 20 of media retainer assembly 14 includes more than one plate section, e.g., first filter media retaining plate section 21A and second filter media retaining plate section 25A. In other alternative embodiments, filter media retaining plate 20 of media retainer assembly 14 may include more than two plate sections. In all embodiments of filter media retainer plate 20, including embodiments where filter media retainer plate 20 includes more than one plate section, media retainer assembly 14 includes a single filter media retainer plate 20, i.e., media retainer assembly 14 includes only one filter media retainer plate 20 connected to the underdrain assembly and filter media retainer plate 20 has a longitudinal axis located in a plane and media retainer assembly 14 does not include any additional plates located above or below filter media retainer plate 20.

Referring to FIGS. 3B and 3C, in one embodiment, first filter media retaining plate section 21A and second filter media retaining plate section 25A are joined together and mechanically sealed end-to-end by a tongue and groove system. Such a connection provides a mechanical seal that prevents passage of filter media 18 (FIG. 6B) through first filter media retaining plate section 21A and second filter media retaining plate section 25A of filter media retaining plate 20. For example, referring to FIG. 3C, the tongue and groove system includes upper tongue 27A and lower tongue 29A extending from end wall 31A of first filter media retaining plate section 21A so as to form a gap therebetween. Mounting apertures 46A are formed in end wall 31A of first filter media retaining plate section 21A through upper tongue 27A and lower tongue 29A. In such an embodiment, a corresponding upper groove 33A and lower groove 35A are formed in end wall 37A of adjacent second filter media retaining plate section 25A with an intermediate wall portion 39A of end wall 37A disposed between upper groove 33A and lower groove 35A. Mounting apertures 46A are formed in end wall 37A of second filter media retaining plate section 25A through intermediate wall portion 39A and overlapping upper groove 33A and lower groove 35A.

Referring to FIGS. 3B and 3C, first filter media retaining plate section 21A and second filter media retaining plate section 25A are joined together to form single filter media retaining plate 20 by fitting upper tongue 27A and lower tongue 29A of end wall 31A of first filter media retaining plate section 21A into the corresponding upper groove 33A and lower groove 35A in end wall 37A of adjacent second filter media retaining plate section 25A, such that intermediate wall portion 39A of end wall 37A is received within the gap between upper tongue 27A and lower tongue 29A of end wall 31A of first filter media retaining plate section 21A and mounting apertures 46A of first filter media retaining plate section 21A and second filter media retaining plate section 25A are aligned. Once first filter media retaining plate section 21A and second filter media retaining plate section 25A are in such a position, fasteners may be positioned through aligned mounting apertures 46A to secure and connect first filter media retaining plate section 21A and second filter media retaining plate section 25A together. In other embodiments, first filter media retaining plate section 21A and second filter media retaining plate section 25A may be joined together by other mechanical methods, such as an interference fit or by a chemical adhesive, such as glue or epoxy.

Advantageously, media retainer assembly 14 of the present disclosure only includes a single filter media retainer plate 20 as described above. In this manner, the cost of media retainer assembly 14 is significantly reduced as compared to filter assemblies that include more than one plate. Additionally, the time and complexity of assembling filter system 10 of the present disclosure is significantly reduced as compared to such filter assemblies that include more than one plate.

Figure 4C:
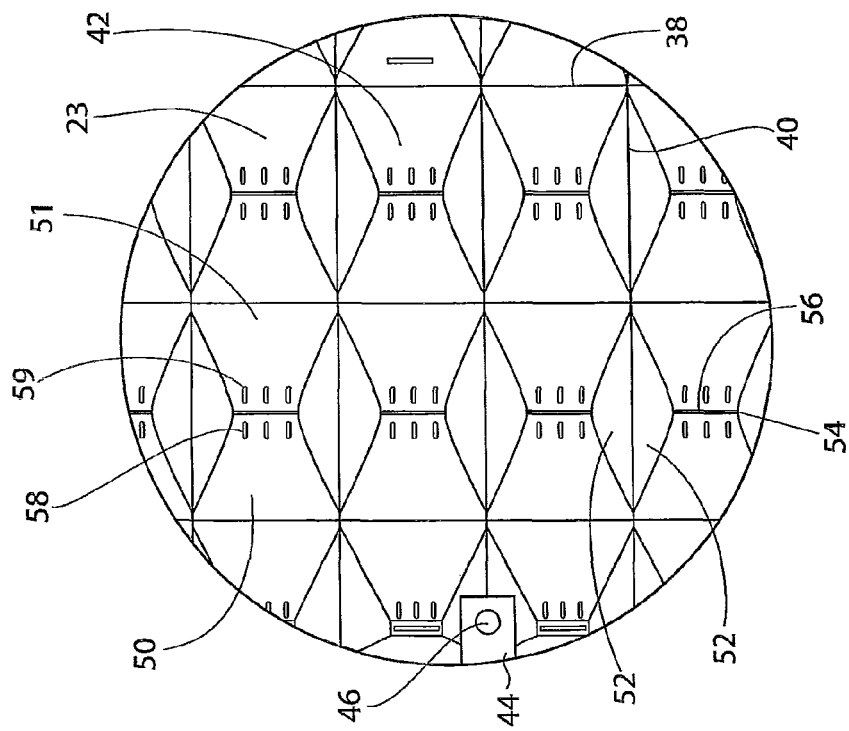
FIG. 4C is a detailed, enlarged fragmentary plan view of a plurality of compartments of the filter media retainer plate of FIG. 4A.
Figure 4E:
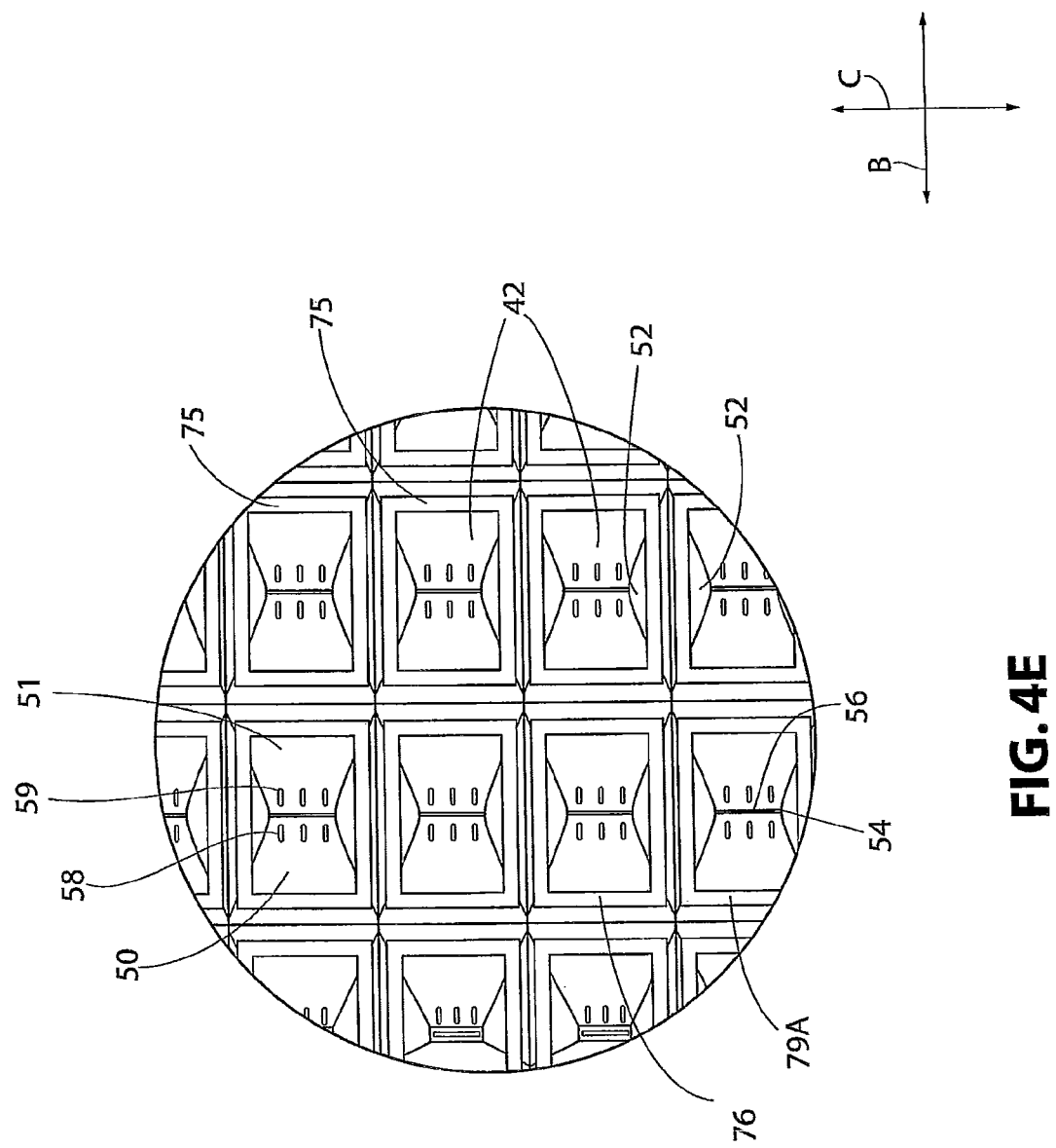
FIG. 4E is a detailed, enlarged fragmentary bottom view of a plurality of compartments of the filter media retainer plate of FIG. 4A in accordance with another exemplary embodiment of the present disclosure.

Referring to FIGS. 3A-5, longitudinal ribs 38 and transverse ribs 40 intersect to form a grid including a plurality of hopper-shaped compartments 42 defined between ribs 38, 40. Each hopper-shaped compartment 42 generally includes a first sloped wall 50 and a second sloped wall 51 each extending inwardly from the longitudinal ribs 38. Referring to FIG. 5, sloped walls 50, 51 each comprise a slope m. In one embodiment, first sloped wall 50 and second sloped wall 51 each have a slope m greater than 0° and less than 90°. In some embodiments, the slope m of first sloped wall 50 may be different than the slope m of second sloped wall 51. Each hopper-shaped compartment 42 also includes opposing vertical walls 52 extending inwardly from the transverse ribs 40. Sloped walls 50, 51 and opposing vertical walls 52 together define filter media chamber 23 and are connected at a base portion 54 to form a hopper structure in the compartment 42 as shown in FIGS. 3-5. Referring to FIG. 4C, base portion 54 is disposed between first sloped wall 50 and second sloped wall 51.

Referring to FIGS. 4A-4C, first sloped wall 50 defines a plurality of first sloped wall or first slots 58, base portion 54 defines a base or second slot 56, and second sloped wall 51 defines a plurality of second sloped wall or third slots 59. In one embodiment, as shown in FIG. 4C, first sloped wall 50 and second sloped wall 51 each define three slots 58, 59. It is contemplated that first sloped wall 50 and second sloped wall 51 may define more or less than three slots 58, 59 depending on a particular application of filter system 10.

Referring to FIGS. 3A-4C, second slot 56 is disposed longitudinally along base portion 54 of each hopper-shaped compartment 42, i.e., second slot 56 extends in the longitudinal direction parallel to longitudinal sidewalls 34, 36. Referring to FIGS. 4A and 4C, first slots 58 and third slots 59 are each perpendicular to second slot 56. In another embodiment, referring to FIG. 4B, first slots 58 and third slots 59 are each oblique to second slot 56. It is contemplated that other orientations of first slots 58 and third slots 59 relative to second slot 56 may be provided. For example, one of first slots 58 and third slots 59 may be perpendicular to second slot 56 and the other of first slots 58 and third slots 59 may be oblique to second slot 56 depending on a particular application of filter system 10.

Referring to FIGS. 5-6B, media retainer assembly 14 includes guide means 76 for directing a flow of a fluid, during a backwash operation of filter system 10, in a vertical direction generally along arrow A (FIG. 6B) through slots 56, 58, 59 of compartments 42. In this manner, guide means 76 is adapted to direct backwash fluid 86 (FIG. 6B) in a vertical direction generally along arrow A (FIG. 6B) through slots 56, 58, 59 (FIGS. 4A-6B) so that backwash fluid 86 actuates filter media 18 to scour top surface 22 of filter media retainer plate 20 and prevent the build-up of biological and/or chemical scaling, such as biological film 96 (FIG. 6B), on filter media retainer plate 20. During the backwash operation of filter system 10, guide means 76 also prevents a flow of a fluid in a horizontal direction generally along arrow B (FIG. 6B) beneath bottom surface 24 of filter media retainer plate 20 beyond the guide means.

Referring to FIGS. 5-6B, in one embodiment, guide means 76 may include a first baffle 72 extending from bottom surface 24 of filter media retainer plate 20 and a second baffle 74 extending from bottom surface 24 of filter media retainer plate 20. In this manner, first baffle 72 and second baffle 74 together are adapted to direct a flow of a fluid in a vertical direction generally along arrow A (FIG. 6B) through slots 56, 58, 59 (FIGS. 4A-6B) and prevent a flow of a fluid in a horizontal direction generally along arrow B (FIG. 6B) beneath bottom surface 24 of filter media retainer plate 20 beyond first baffle 72 and second baffle 74 as will be described in more detail below. Referring to FIG. 5, in one embodiment, a first baffle 72 may extend from bottom surface 24 of first sloped wall 50 of each hopper-shaped compartment 42 and a second baffle 74 may extend from bottom surface 24 of second sloped wall 51 of each hopper-shaped compartment 42. As shown in FIGS. 5-6B, baffles 72, 74 extend from bottom surface 24 of each hopper-shaped compartment 42 beyond the bottom of base portion 54 of each hopper-shaped compartment 42.

Referring to FIG. 4D, in another embodiment, guide means 76 may also include a third baffle 77 extending from bottom surface 24 of filter media retainer plate 20 in each hopper-shaped compartment 42 and a fourth baffle 78 extending from bottom surface 24 of filter media retainer plate 20 in each hopper-shaped compartment 42. In such an embodiment, first baffle 72, second baffle 74, third baffle 77 and fourth baffle 78 together form a baffle enclosure 79 in each hopper-shaped compartment 42. Referring to FIG. 4D, baffle enclosure 79 has a rectangular shape.

Referring to FIG. 4E, in an alternative embodiment, guide means 76 may include a continuous baffle wall 75 forming an alternative baffle enclosure 79A in each hopper-shaped compartment 42. Referring to FIG. 4E, alternative baffle enclosure 79A has a rectangular shape. In the embodiments shown in FIG. 4D or FIG. 4E, baffle enclosure 79 (FIG. 4D) and alternative baffle enclosure 79A (FIG. 4E) are each adapted to direct a flow of a fluid in a vertical direction generally along arrow A (FIG. 6B) through slots 56, 58, 59 (FIGS. 4A-6B); prevent a flow of a fluid in a horizontal direction generally along arrow B (FIGS. 4D, 4E and 6B) beneath bottom surface 24 of filter media retainer plate 20 beyond first baffle 72 (FIGS. 4D and 6B) and second baffle 74 (FIGS. 4D and 6B), or opposing walls of continuous baffle 75 (FIG. 4E); and prevent a flow of a fluid in a horizontal direction generally along arrow C (FIGS. 4D and 4E) beneath bottom surface 24 of filter media retainer plate 20 beyond third baffle 77 (FIG. 4D) and fourth baffle 78 (FIG. 4D), or opposing walls of continuous baffle 75 (FIG. 4E), as will be described in more detail below.

It is also contemplated that guide means 76 may include similar mechanisms to provide a physical barrier to direct a flow of a fluid. For example, guide means 76 may include a conduit system.

Referring to FIGS. 4A-6B, filter media 18 (FIG. 6B) is disposed on top surface 22 in filter media chamber 23 of filter media retainer plate 20 and is adapted to scour top surface 22 of filter media retainer plate 20 as will be described in more detail below. Although FIG. 6B illustrates twelve filter media particles 18 to more clearly illustrate the direction of flow of filter media 18 to scour top surface 22 of filter media retainer plate 20 during a backwash operation of filter system 10, top surface 22 of media retainer plate 20 may support a layer or multiple layers of filter media 18 as is well known to a person having ordinary skill in the art. During a filtering operation, filter media 18 acts to remove dirt, debris, chemical and biological contaminants from liquid containing particles, such as liquid 90 (FIG. 6A), flowing through filter system 10, i.e., liquid 90 passing in a direction generally along arrows 92 (FIG. 6A) from filter media chamber 23 of filter media retainer plate 20 to underdrain chamber 84 of underdrain assembly 12.

Advantageously, filter system 10 of the present disclosure utilizes filter media 18 to remove dirt, debris, chemical and biological contaminants from liquid containing particles flowing through filter system 10 and also utilizes filter media 18 to scour top surface 22 of filter media retainer plate 20 and remove any biological films 96 that may accumulate on filter media retainer plate 20 to prevent clogging of slots 56, 58 and 59. Filter system 10 of the present disclosure does not require any separate scouring particles in addition to the filter media. Accordingly, the cost and complexity of filter system 10 of the present disclosure is significantly reduced as compared to filter assemblies that include separate scouring particles in addition to the filter media.

Referring to FIG. 6B, each hopper-shaped compartment 42 acts as a chamber for containing and retaining filter media 18. First slot 58, second slot 56 and third slot 59 of each hopper-shaped compartment 42 have a sufficient width so as to prevent filter media 18 from passing through filter media retainer plate 20, while not creating any significant head loss in filter system 10 during filtering and backwashing operations thereby allowing for a desired flow velocity during backwashing and minimizing biology from clogging slots 56, 58, 59 due to biological and chemical scaling.

Referring to FIGS. 1, 2, and 6A, underdrain assembly 12 generally includes underdrain wall 82 defining underdrain chamber 84 adapted to contain a backwash fluid 86. In one embodiment, backwash fluid 86 may contain both a backwash liquid and a backwash gas. Underdrain wall 82 also defines a plurality of underdrain slots 88 therethrough. Referring to FIGS. 6A and 6B, filter media chamber 23 of each hopper-shaped compartment 42 is in fluid communication with underdrain chamber 84 of underdrain assembly 12 via first slots 58, second slots 56, and third slots 59 of filter media retainer plate 20 and underdrain slots 88 of underdrain assembly 12.

Referring to FIGS. 6A and 6B, filtering and backwashing operations of filter system 10 will now be described. Referring to FIG. 6A, during a filtering operation, a liquid such as liquid 90 which contains undesirable particles to be filtered enters filter media chamber 23 of filter media retainer plate 20 as shown in FIG. 6A. Next, liquid 90 containing particles flows in a direction generally along arrows 92 through the filter media chamber 23 to underdrain chamber 84. During this process, filter media 18 (FIG. 6B) removes the undesirable particles contained in liquid 90, such as dirt, debris, chemical and biological contaminants, and the filtered liquid 90 travels through slots 56, 58, 59 of hopper-shaped compartment 42 and into underdrain chamber 84.

Referring to FIG. 6B, during a backwash operation, backwash fluid 86 will flow from underdrain chamber 84 in a direction generally along arrows 60 to filter media chamber 23 via underdrain slots 88 and slots 56, 58, 59 of hopper-shaped compartment 42. First baffle 72 and second baffle 74 together direct the flow of backwash fluid 86 from underdrain chamber 84 to filter media chamber 23. For example, first baffle 72 and second baffle 74 provide physical barriers which direct the flow of backwash fluid 86. In a vertical direction generally along arrow A (FIG. 6B), first baffle 72 and second baffle 74 direct the flow of backwash fluid 86 through first slot 58, second slot 56, and third slot 59 of each hopper-shaped compartment 42. In one embodiment, first baffle 72 and second baffle 74 together symmetrically direct the flow of backwash fluid 86 in a vertical direction generally along arrow A (FIG. 6B) through first slot 58, second slot 56, and third slot 59. In a horizontal direction generally along arrow B (FIG. 6B), first baffle 72 and second baffle 74 prevent the flow of backwash fluid 86 beneath bottom surface 24 of filter media retainer plate 20 beyond first baffle 72 and second baffle 74. In one embodiment, first baffle 72 and second baffle 74 prevent the flow of backwash fluid 86 in a horizontal direction generally along arrow B (FIG. 6B) beneath bottom surface 24 of filter media retainer plate 20 beyond first slot 58 and third slot 59, i.e., if backwash fluid 86 flows beyond first slot 58 or third slot 59, backwash fluid 86 will contact first baffle 72 or second baffle 74 and be directed by first baffle 72 or second baffle 74 back towards and through first slot 58 or third slot 59 to filter media chamber 23.

With backwash fluid 86 directed to flow in a vertical direction generally along arrow A (FIG. 6B) through first slot 58, second slot 56, and third slot 59, backwash fluid 86 actuates filter media 18 and creates high velocity zones of flow of filter media 18 in hopper-shaped compartments 42 to move filter media 18 in a flow stream indicated by arrows 62 (FIG. 6B) to create a swirling action of filter media 18 within filter media chamber 23. For example, as backwash fluid 86 passes through base or second slot 56 of hopper-shaped compartment 42, backwash fluid 86 will initially act upon filter media 18 to begin movement of filter media 18. As backwash fluid 86 passes through first slot 58 and third slot 59, backwash fluid 86 will act upon filter media 18 to continue the movement of filter media particles 18 upward in the plurality of flow streams indicated by arrows 62. In this manner, the plurality of flow streams of filter media 18 will cause a collision between filter media particles 18 and top surface 22 of filter media retainer plate 20, i.e., sloped walls 50, 51 of hopper-shaped compartment 42. As shown in FIG. 6B, the filter media particles 18 will move in a high velocity circular flow zone 62 and a contact portion 64 of filter media 18 will scour sloped walls 50, 51 at a collision or impact zone 66 so that the contact portion 64 of filter media 18 will scour and/or scrape chemical or biological film 96 from sloped walls 50, 51 to prevent clogging of slots 56, 58, 59. By having sloped walls 50, 51 with slope m greater than 0° and less than 90°, the particles of filter media 18 will then move downward along sloped walls 50, 51 of hopper-shaped compartment 42 to scrape biological film 96 from additional portions of sloped walls 50, 51. Additionally, the particles of filter media 18 are sized so that the flow velocities created by backwash fluid 86, via slots 56, 58, 59 and baffles 72, 74, move the particles of filter media 18 to create the above-described scouring action.

In one embodiment, first slot 58 and third slot 59 are oriented in a manner relative to second slot 56, i.e., perpendicular to second slot 56 (FIGS. 4A and 4C) and/or oblique to second slot 56 (FIG. 4B), to create a vertical discharge of backwash fluid 86 during backwash operations. The location and size of slots, 56, 58, 59 allow for the creation of high velocity zones within filter media chamber 23 as described above. Compartments 42 having the above-described hopper-shape enhance the movement of filter media 18 along sloped walls 50, 51 during a backwashing operation by reducing dead areas where filter media particles 18 are not under the influence of the above-described high-flow velocities during backwashing. Sloped walls 50, 51 and vertical walls 52 of each hopper-shaped compartment 42 allow filter media 18 to slide toward base portion 54 due to gravity to further enhance the movement of filter media 18.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A filter system for filtering a liquid containing particles, the filter system comprising:
   an underdrain assembly having an underdrain wall defining an underdrain chamber adapted to contain a backwash fluid and
   a media retainer assembly, comprising:
      a filter media retainer plate having a top surface defining a filter media chamber, a bottom surface, and defining at least one hopper-shaped compartment having a first sloped wall defining a first slot and a base portion defining a second slot, the first slot and the second slot each spanning the top surface and the bottom surface of the filter media retainer plate, the filter media chamber in fluid communication with the underdrain chamber;
      a filter medium disposed on the top surface of the filter media retainer plate, the filter medium adapted to capture the particles from the liquid with the liquid passing from the filter media chamber to the underdrain chamber, and the filter medium adapted to scour the top surface of the filter media retainer plate with the backwash fluid passing from the underdrain chamber to the filter media chamber;
      a first baffle extending from the bottom surface of the filter media retainer plate;
      a second baffle extending from the bottom surface of the filter media retainer plate, the first baffle and the second baffle together adapted to direct the backwash fluid in a vertical direction through the first slot and the second slot and prevent the backwash fluid in a horizontal direction beneath the bottom surface of the filter media retainer plate beyond the first baffle and the second baffle;
      a third baffle extending from the bottom surface of the filter media retainer plate; and
      a fourth baffle extending from the bottom surface of the filter media retainer plate, the third baffle and the fourth baffle together adapted to direct the backwash fluid in the vertical direction through the first slot and the second slot and prevent the backwash fluid in the horizontal direction beneath the bottom surface of the filter media retainer plate beyond the third baffle and the fourth baffle, wherein the first baffle, the second baffle, the third baffle, and the fourth baffle together form a baffle enclosure.

2. The filter system of claim 1, wherein the underdrain wall defines at least one underdrain slot, the underdrain chamber in fluid communication with the filter media chamber via the underdrain slot and the first slot and the second slot of the filter media retainer plate.

3. The filter system of claim 2, wherein the backwash fluid passes from the underdrain chamber to the filter media chamber during a backwash of the filter system.

4. The filter system of claim 3, wherein the backwash fluid includes a backwash liquid and a backwash gas.

5. The filter system of claim 1, wherein the hopper-shaped compartment further comprises a second sloped wall defining a third slot, the base portion disposed between the first sloped wall and the second sloped wall.

6. The filter system of claim 5, wherein the first baffle and the second baffle are together adapted to direct the backwash fluid in the vertical direction through the first slot, the second slot, and the third slot and prevent the backwash fluid in the horizontal direction beneath the bottom surface of the filter media retainer plate beyond the first slot and the third slot.

7. The filter system of claim 1, wherein the filter media retainer plate defines a plurality of hopper-shaped compartments.

8. The filter system of claim 1, wherein the media retainer assembly is adapted to be connected to the underdrain assembly.

9. The filter system of claim 8, wherein only the filter media retainer plate is connected to the underdrain assembly.

10. The filter system of claim 9, wherein the filter media retainer plate comprises one plate section.

11. The filter system of claim 9, wherein the filter media retainer plate comprises more than one plate section.

12. The filter system of claim 1, wherein the first baffle and the second baffle are together adapted to symmetrically direct the backwash fluid in the vertical direction through the first slot and the second slot.

13. The filter system of claim 1, wherein the first baffle, the second baffle, the third baffle, and the fourth baffle comprise a single continuous baffle wall.

* * * * *